Patented Mar. 5, 1946

2,396,193

UNITED STATES PATENT OFFICE 2,396,193

PREPARATION OF MELAMINE

Joseph H. Paden, Glenbrook, and Johnstone S. Mackay, Greenwich, Conn., assignors to American Cyanamid Company, New York, N. Y., a corporation of Maine No Drawing. Application November 24, 1943, Serial No. 511,596

5 Claims. (Cl. 260—249.5)

This invention relates to the preparation of melamine.

The compound commonly known as melamine is a white, crystalline solid having a melting point of about 354° C. It has the empirical formula, $C_3N_6H_6$, and is generally believed to have the following structural formula:

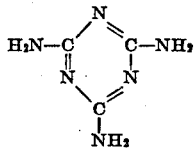

As such, it is frequently called 2,4,6-triamino-1,3,5-triazine. Some of its reactions suggest that it may also exist in whole or in part in one or more isomeric forms such as:

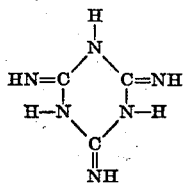

and

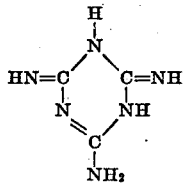

Absolute proof of the exact structure of melamine, or its supposed isomers, has not been definitely established, but the term "melamine" is commonly recognized and is used herein by us as including 2,4,6-triamino-1,3,5-triazine and its several isomers.

Although melamine has been known for many years, the only commercially feasible methods for its production have utilized cyanamide or dicyandiamide as starting materials. These latter compounds yield melamine in fair to good yields by polymerization upon heating, either alone or with several different types and kinds of solvents, diluents, catalysts, etc. A few other organic nitrogen compounds, for example, guanidine salts, have been said to yield small percentages of melamine along with various other compounds when heated at temperatures up to about 200° C.

We have now found that melamine can be prepared from cyanourea by heating this substance at temperatures of about 200° C., or preferably higher, in the presence of its thermal decomposition products. Empirically, the reaction may be expressed as follows:

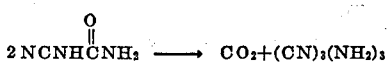

The actual mechanism by which melamine is formed from cyanourea has not been established by us as yet, but probably involves the formation and interreaction, polymerization or rearrangement of thermal decomposition products of cyanourea with each other or with cyanourea itself. We have found, for example, that tricyanurea (cyanuric triureide), a thermal decomposition product of cyanourea, can be converted into melamine by heating at temperatures above 200° C. At temperatures of about 200° C. the formation of melamine from cyanourea requires an extended heating period of many hours, and even then only low yields of melamine are obtained. At higher temperatures, for example 350° C., the formation of melamine from cyanourea is much more rapid, and appreciable amounts of melamine may be obtained upon heating cyanourea for an hour or so. At still higher temperatures, 400–450° C., the conversion of cyanourea to melamine takes place very rapidly, and excellent yields of melamine are obtained within a few minutes. The formation of melamine in good yields at these higher temperatures is most surprising since it is known that melamine commences to decompose when heated at 350° C., or higher.

The length of time required to bring about a substantial conversion of melamine from cyanourea depends considerably upon the temperature employed. At a temperature of 200° C., a heating period of 16 hours gave an 8 per cent yield of melamine. On the other hand, at 400–450° C. excellent yields of melamine may be obtained within 15–20 minutes. At still higher temperatures, for example 500–550° C., the conversion of cyanourea to melamine takes place almost instantaneously. Since, as stated before, melamine decomposes at the higher temperatures, it is not considered advisable to continue the heating period beyond the time necessary to bring about a maximum conversion of cyanourea to melamine.

Although we have found that melamine can be prepared by heating cyanourea alone in the presence of its thermal decomposition products, we have also found that still better yields of melamine are obtained when the conversion takes place in the presence of an atmosphere of ammonia. As will be evident from the specific examples, we obtain a higher yield of melamine at a lower temperature in the same heating time when the conversion takes place in an atmosphere of ammonia. The reasons for the better results which are obtained in an atmosphere of ammonia are not clear since it may be due to a variety of factors including the stabilizing effect of ammonia on melamine and certain other hypothetical intermediate reaction products, or it may be due to a mass action effect in which a large amount of ammonia favors an intermediate reaction leading to the formation of melamine. Undoubtedly, some ammonia is formed from cyanourea when it is heated at the temperatures named and still further amounts of ammonia appear to have beneficial effects.

We have also discovered that a higher yield of melamine can be obtained from cyanourea when it is heated in the presence of a small amount of water. The reasons for this may be due to the effect of water in breaking up cyanourea to form intermediate products which later combine to yield melamine. Usually, not more than about 1 mol of water for each molecule of cyanourea is employed by us.

In order to heat cyanourea in the presence of its thermal decomposition products it is necessary that the material be heated in a closed reaction vessel, preferably in a pressure autoclave. The absolute pressure over the reaction zone is not particularly critical. Ordinarily, we merely place the cyanourea in an autoclave of conventional type, add ammonia thereto, and conduct the reaction at the pressure autogenously developed in the autoclave. The pressure may vary from about 50 pounds per square inch to 3000 pounds per square inch or more, depending upon the head space in the autoclave, the amount of ammonia added, the temperature to which it is heated, etc.

A few representative trial runs in which melamine was prepared from cyanourea under varying conditions of time and temperature will now be described in the following examples. It will be understood, of course, that these examples are intended to be representative only and do not, and are not intended to, limit our invention to the particular conditions described.

Example 1

50 g. of cyanourea was placed in an autoclave having an internal volume of 300 cc. The autoclave was then sealed and heated up to a temperature of 350° C. After the contents of the autoclave had been heated for 2 hours at 350° C. under the autogenously developed pressure, the autoclave was cooled in running water and opened. Sublimed crystals of melamine of high purity were found deposited on the cooler portions of the autoclave. Collection of the sublimed melamine and analysis of the residue showed that melamine was formed during the heating period with a yield corresponding to 13.7 per cent of theoretical.

Example 2

The above experiment was repeated with the difference that the contents of the autoclave were heated for 15 minutes at 400° C. A yield of melamine representing 23.8 per cent of theoretical was obtained.

Example 3

50 g. of cyanourea and 9.5 g. of water were placed in a 300 cc. autoclave, and the autoclave was sealed and heated at 350° C. for 2 hours as above. After the autoclave had been cooled and opened, it was found to contain melamine representing a yield of 25.8 per cent of theoretical.

Example 4

50 g. of cyanourea and 25 g. of anhydrous ammonia were placed in an autoclave and heated for 2 hours. Several runs were made at different temperatures. After the autoclave had been cooled and opened, the contents were analyzed for melamine. The results of this series of experiments are shown in the following table:

[Ratio of 1 mol cyanourea to 2.5 mols ammonia.]

| Temperature | Heating time | Per cent yield melamine |
|---|---|---|
| 200° C | 2 hours | 5.5 |
| 250° C | do | 13.2 |
| 300° C | do | 30.3 |
| 350° C | do | 59.0 |
| 400° C | 15 minutes | 88.9 |

As will be noted from the above results the formation of melamine from cyanourea is greatly favored by higher temperatures.

Example 5

50 g. of cyanourea, 25 g. of ammonia, and 10.0 g. of water were placed in an autoclave and heated at 350° C. for 2 hours under the autogenously developed pressure. A yield of 46.3 per cent of melamine was obtained.

Melamine may be recovered in a high degree of purity from the reaction vessel by any one of several methods. Melamine crystals of an exceptionally high degree of purity are sublimed at the higher reaction temperatures and are deposited on cooler parts of the reaction vessel or on the walls of an adjacent collecting chamber connected thereto. Melamine may also be recovered from the residue in the reaction vessel by leaching the residue with hot water and filtering to remove insolubles. Melamine may be crystallized from the solution by cooling, with additional concentration if necessary. The addition of a small amount of alkali, such as sodium hydroxide, will further improve the purity of the product by causing alkali-soluble substances, which are frequently associated with melamine, to remain in solution while the melamine crystallizes out.

We claim:

1. A method of preparing melamine which comprises heating cyanourea under pressure at a temperature of at least 200° C. until melamine has been formed and thereafter recovering the melamine thus formed before substantial decomposition thereof.

2. A method of preparing melamine which comprises heating cyanourea and its thermal decomposition products at temperatures of at least 200° C. in a closed vessel under the pressure autogenously developed until melamine has been formed and thereafter recovering the melamine thus formed before substantial decomposition thereof.

3. A method of preparing melamine which comprises heating cyanourea under pressure at a temperature of at least 200° C. in an atmosphere of ammonia until melamine has been formed and thereafter recovering the melamine thus formed before substantial decomposition thereof.

4. A method of preparing melamine which comprises heating cyanourea under pressure at temperatures of at least 200° C. in the presence of a small amount of water until melamine has been formed and thereafter recovering the melamine thus formed before substantial decomposition thereof.

5. A method of preparing melamine which comprises heating cyanourea under pressure at temperatures within the range 350–450° C. in an atmosphere of ammonia until melamine has been formed and thereafter recovering the melamine thus formed before substantial decomposition thereof.

JOSEPH H. PADEN.
JOHNSTONE S. MACKAY.